UNITED STATES PATENT OFFICE.

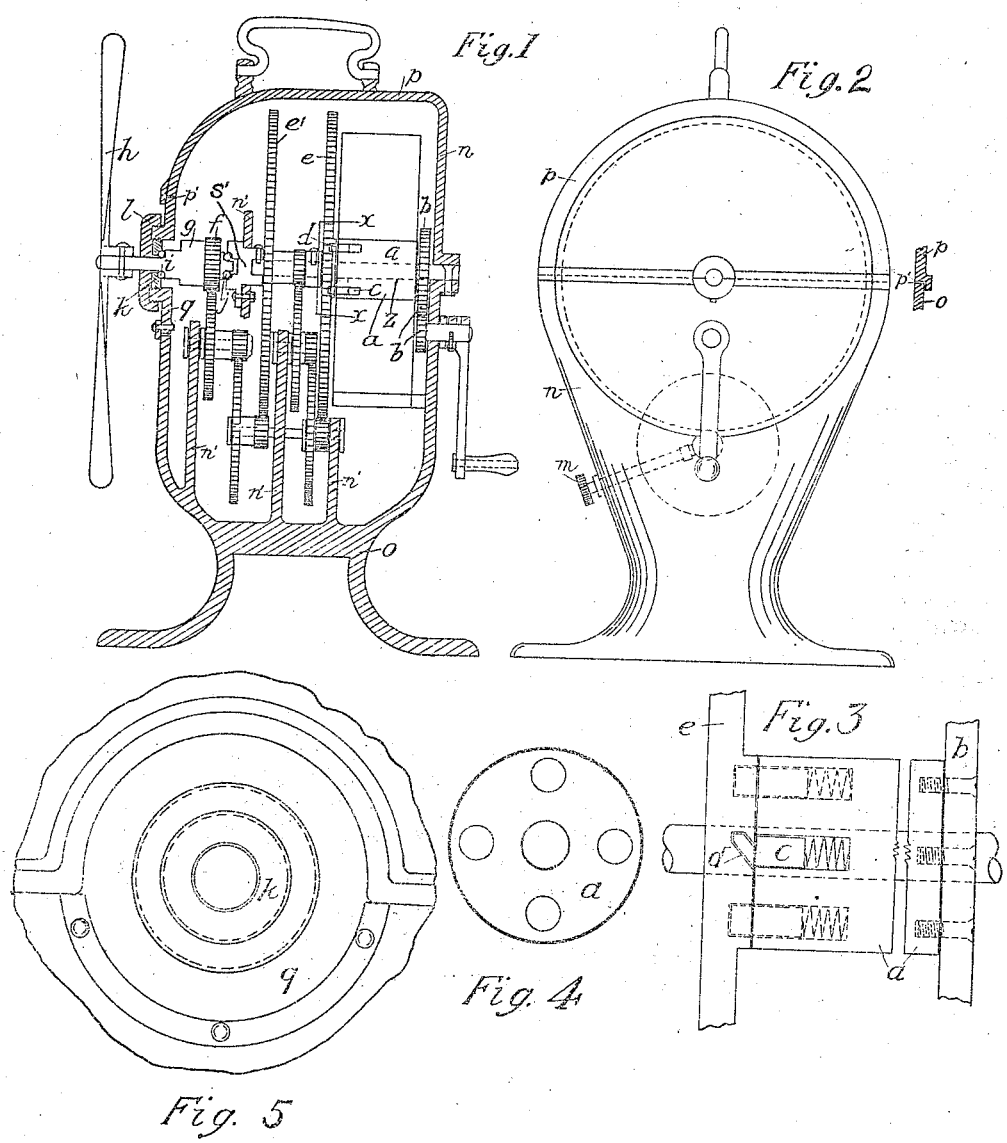

JOHN ANDREW SWENEY, OF ALBUQUERQUE, NEW MEXICO, ASSIGNOR TO LYDIA B. SWENEY, OF ALBUQUERQUE, NEW MEXICO.

AIR-FAN.

1,242,116.  Specification of Letters Patent.  Patented Oct. 2, 1917.

Application filed June 19, 1915.  Serial No. 35,122.

*To all whom it may concern:*

Be it known that I, JOHN ANDREW SWENEY, a citizen of the United States, residing at Albuquerque, in the county of Bernalillo and the State of New Mexico, have invented a new and useful Air-Fan, of which the following is a specification.

My invention relates to improvements in air fans in which the fan is mounted on a rotating, balanced and adjustable shaft and the driving mechanism revolves about and is supported by a fixed shaft.

I attain these and other objects by the mechanism illustrated in the accompanying drawing which is a part of this specification and in which similar letters refer to similar parts throughout the several views.

Figure 1 is a sectional view of the complete apparatus. Fig. 2 is a rear elevation of the complete fan. Fig. 3 is a view of the winding spring ratchet. Fig. 4 is a view of the ratchet plate which the dogs or catches engage. Fig. 5 is a front elevation of the fan casing, the fan and fan shaft being removed. In Fig. 1 $a$ is the driving spring hub, to the outer end of which is attached the winding gears $b$ and at the inner end of the hub are placed a number of pawls, by means of which the hub engages the drive wheel $e$, thus actuating the system of gears. $s$ is the shaft about which the hub $a$, the drive wheel $e$ and the wheel $e'$ revolve. The shaft $s$ is supported at its outer end in a groove in the upper wall of the base, and at its inner end by the bearing block $s'$. $g$ is the fan shaft having two sets of bearings, $i$ and $j$. The bearing $i$ is adjustable by means of the ring $k$ and is protected by the dust cap $l$, and is supported by the upper wall of the case. The inner end of the shaft $g$ is supported by the bearing block $s'$. In Fig. 2 $m$ represents the brake, by means of which the mechanism is started, stopped or impeded. Other details as shown.

Although I have described the construction and nature of the invention in detail, it is obvious that the same may be variously modified.

Having thus described my invention, I claim as new and desire to secure by Letters Patent:

In a fan, the combination with a casing, of a bearing block in its interior, a fixed shaft mounted in said bearing block and a wall of the casing, a rotary shaft in alinement with said shaft mounted in said bearing block and another wall of the casing, a fan upon said rotary shaft exterior to the casing, a motor mounted to rotate on said fixed shaft, a train of transmitting gearing between said motor and said fan shaft which comprises gear wheels mounted to rotate upon said fixed shaft and gear wheels mounted to rotate in bearings within said casing, substantially as described.

JOHN ANDREW SWENEY.

Witnesses:
 A. E. HUTCHINSON,
 H. I. HUTCHINSON.